Jan. 26, 1960
R. M. CARRIER, JR
2,922,514
BALANCED SPIRAL CONVEYORS
Filed June 21, 1952
3 Sheets-Sheet 1
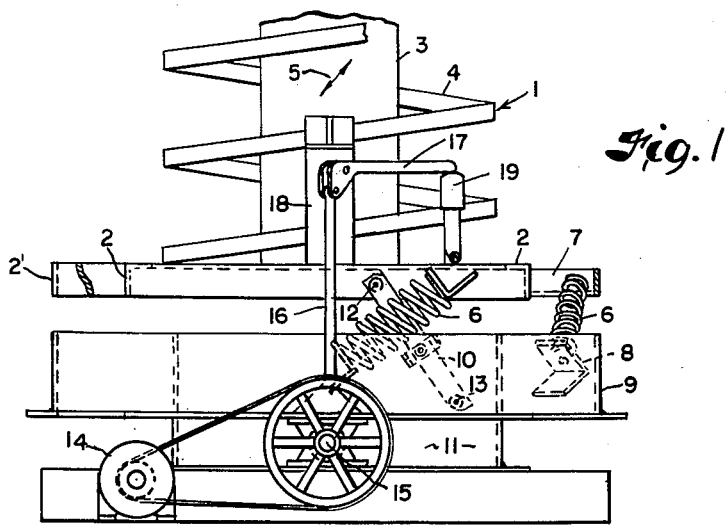
Fig. 1
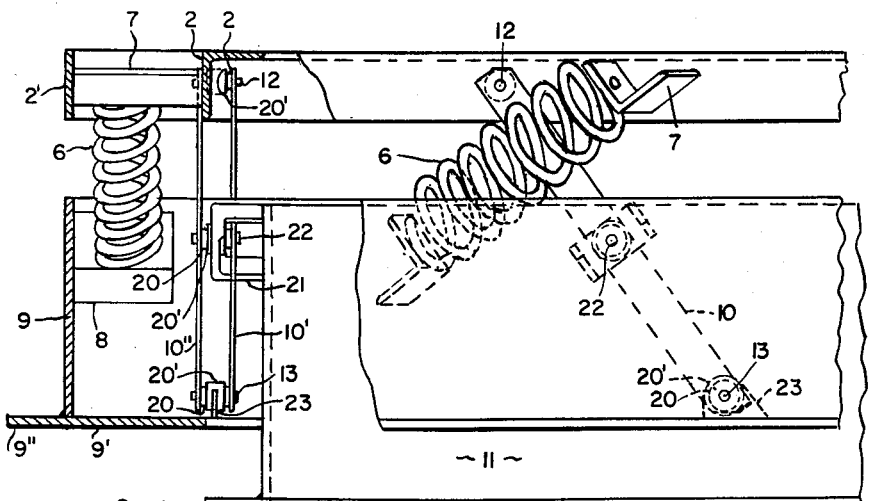
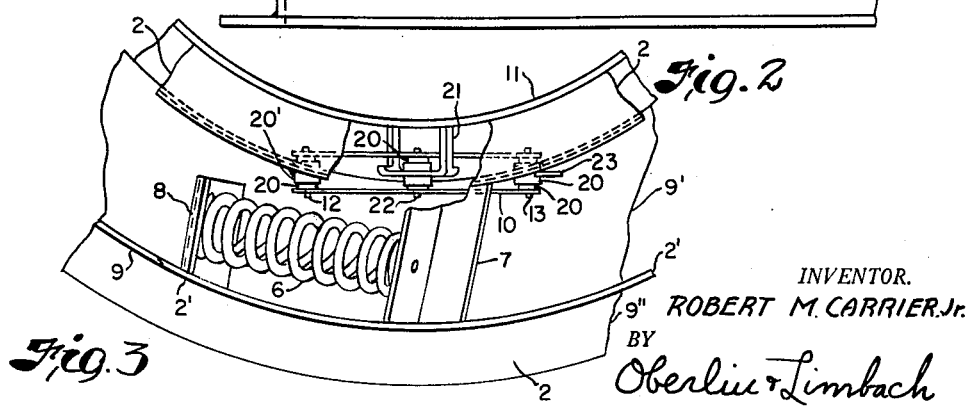
Fig. 2
Fig. 3
INVENTOR.
ROBERT M. CARRIER Jr.
BY
Oberlin & Limbach
ATTORNEYS.

Jan. 26, 1960 R. M. CARRIER, JR 2,922,514
BALANCED SPIRAL CONVEYORS
Filed June 21, 1952 3 Sheets-Sheet 2

INVENTOR.
ROBERT M. CARRIER, JR.
BY
Oberlin + Limbach
ATTORNEYS.

Jan. 26, 1960 R. M. CARRIER, JR 2,922,514
BALANCED SPIRAL CONVEYORS
Filed June 21, 1952 3 Sheets-Sheet 3
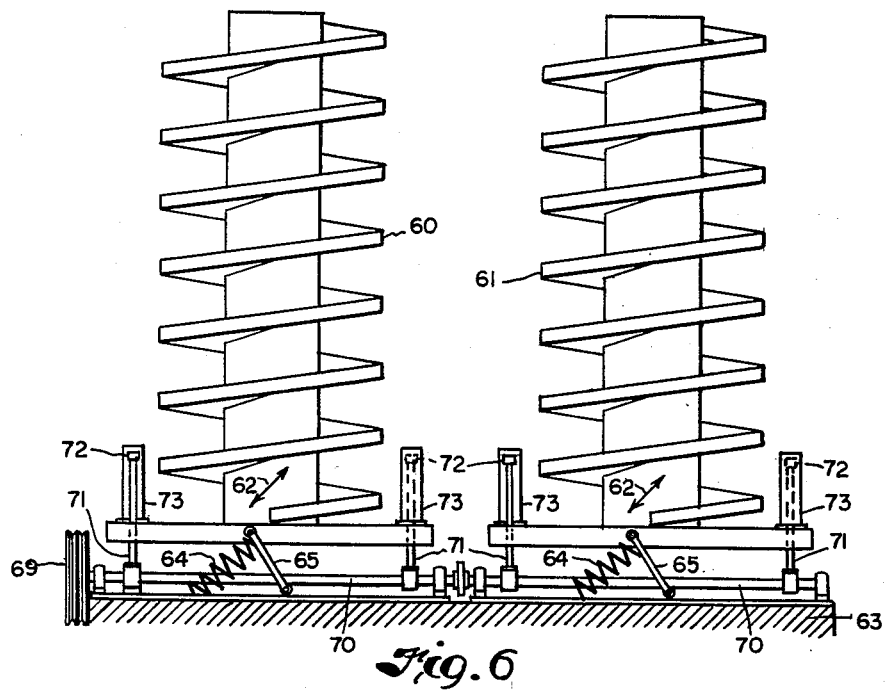
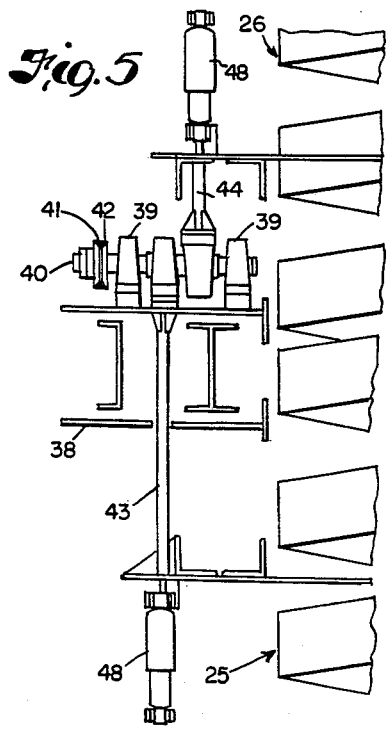
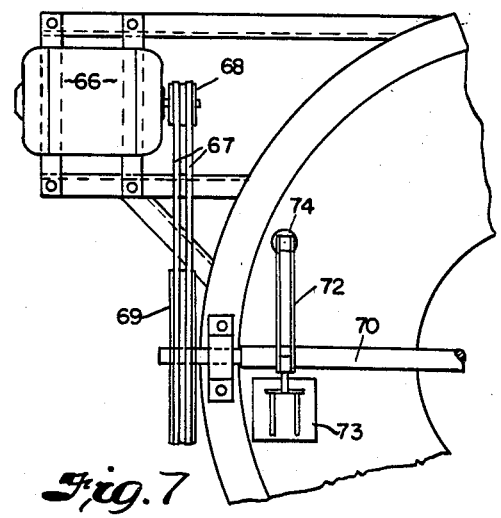
INVENTOR.
ROBERT M. CARRIER, JR.
BY
Oberlin & Limbach
ATTORNEYS.

United States Patent Office 2,922,514
Patented Jan. 26, 1960

2,922,514

BALANCED SPIRAL CONVEYORS

Robert M. Carrier, Jr., Louisville, Ky., assignor to Carrier Conveyor Corporation, Louisville, Ky., a corporation of Kentucky Application June 21, 1952, Serial No. 294,880

6 Claims. (Cl. 198—220)

The present invention relates generally as indicated to balanced spiral conveyors and more particularly to balanced spiral conveyors of the type which have helical material supporting pans which are mounted for vibration along generally helical paths of helix angle such that material supported on the pans is thrown forwardly and upwardly along the pans and thereby conveyed.

It is one object of the present invention to provide a balanced spiral conveyor in which a counterbalance member, as such, or in the form of an endwise adjacent or sidewise adjacent spiral conveyor, is operated in phase opposition with the first-mentioned spiral conveyor to thereby cancel opposed forces at the driving means and support base therefor.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation view of the lower end portion of one form of the present invention;

Figs. 2 and 3 are enlarged fragmentary side elevation and top plan views of the resilient supporting means for the conveyor of Fig. 1;

Fig. 5 is a fragmentary side elevation view of the drive assembly for the spiral conveyors of Fig. 4 (as viewed from the right-hand side) for operating said conveyors in phase opposition; and Figs. 6 and 7 are side elevation and fragmentary top plan views of spiral conveyors disposed side by side and operated in phase opposition to balance the forces on the common base therefor.

Figure 4:
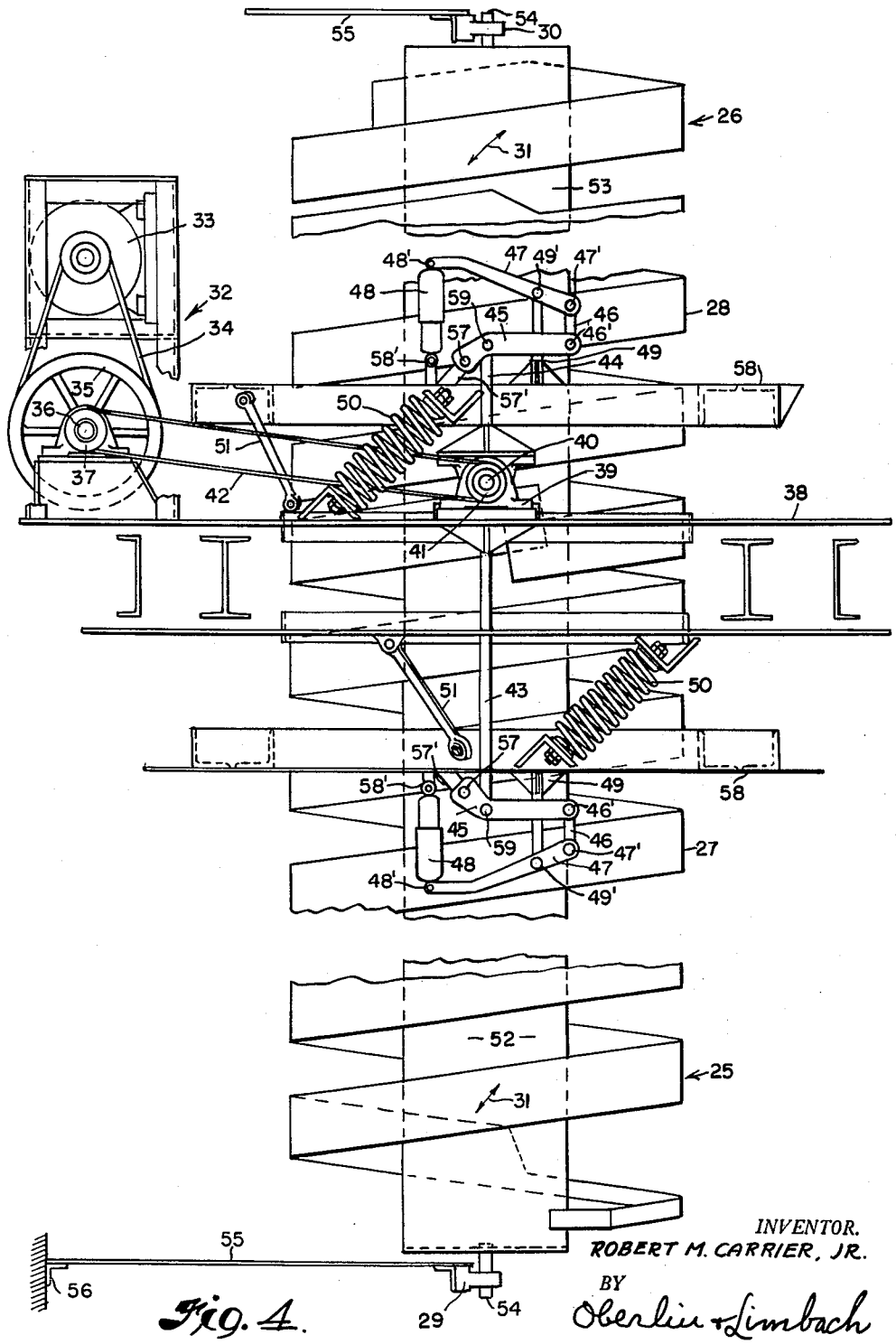
Fig. 4 is a side elevation view of a balancing arrangement wherein spiral conveyors are disposed in endwise adjacent and coaxial relation and vibrated in phase opposition.

Referring now in greater detail to the drawings and first to Figs. 1–3, the conveyor 1 is shown as comprising a base 2 from which a center tube 3 extends vertically, a helical material supporting pan 4 being wrapped about said center tube, said conveyor being adapted to be vibrated as along the path indicated by the line 5 so that material loaded onto said pan 4 at the lower portion thereof will be tossed forwardly and upwardly and thus conveyed vertically around said pan for discharge from the upper end portion thereof.

The conveyor 1 just described is resiliently supported for vibration along the generally helical path indicated by the line 5 as by means of obliquely disposed and circularly arranged coil springs 6, the upper ends of which are bolted to and bear against angle bracket cross members 7 of said base or platform 2 which extend to and are secured as by welding to an outer ring 2' which functions as a spring guard and to reinforce the bracket 7. The lower ends of the springs 6 are secured to and bear against angle braces 8 which are welded or otherwise secured around the inner periphery of a counterbalancing ring 9. Counterbalancing ring 9 has a cylindrical portion which is shown coincident with outer ring 2' in Fig. 3 and an inner and outer flange 9' and 9" at its lower end.

Guiding of the conveyor for such vibration along the path 5 and lateral support for said coil springs 6 is provided by means of the pivotally mounted rod-like members 10 which have their upper and lower ends respectively pivotally connected to base 2 and to said counterbalancing ring 9, said rod-like members being pivotally secured intermediate their ends around a central base member 11 which is adapted to be secured to the floor of the building in which the conveyor is disposed. As best seen in Fig. 3 and on the left side of Fig. 2 each of the rods 10 are made up of a pair of leaf springs 10' and 10" which are spaced apart by rubber bushings 20 each mounted within a bushing ring 20' suitably secured to the base, conveyor and counterbalance ring. The base mounting comprises a U-shaped bracket 21 mounted as by welding the ends of the legs of the U to the cylindrical sides of base 11 and aligning the planes of those legs generally parallel to the axis of the support rod 10. Bushing ring 20' can be welded into the generally flat bight of the U. The rod 10 is mounted on a shaft 22 bushed within bushing 19 so that spring 10" is outside the bight of the U while spring 10' is within the bight. Similarly, the ends of rod 10 are pivoted on shaft 12 and 13 fitted through bushings 20. The bushing on shaft 12 is fitted within a bushing ring 20' welded in the flange of ring 2. The bushing ring on shaft 13 is welded to a bracket 23 welded to inner flange 9' of counterbalance ring 9. As shown, said rod-like members 10 are disposed substantially at right angles to the axes of coil spring 6 whereby the paths of movement of the top and bottom pivots 12 and 13 thereof will be substantially parallel to the path of vibration 5 of the conveyor 1. The pivots 12 and 13 will preferably be rubber-bushed so that the conveyor vibration can occur along a helical path as indicated.

As is apparent, the foregoing construction results in a balancing of the forces, since the counterbalancing member 9 and the conveyor 1 are vibrated in direct phase opposition, that is, when said conveyor 1 is moving upwardly along the helical path 5 the counterbalancing member is moving downwardly along such helical path, and similarly when the conveyor is moving downwardly along the helical path the counterbalancing member is moving upwardly along such path. The provision of coil springs 6 compressed between said conveyor 1 and said counterbalancing member 9 serves as a resilient support which enables the conveyor to settle to a position according to the load of the material being conveyed thereby, and of course the rods 10 serve to provide lateral support for said springs 6 so that the conveyor is jointly supported by said springs and rods and additionally serve to guide the conveyor 1 and member 9 for vibration along the helical path 5.

The driving of the conveyor is preferably effected as by means of motor 14 which drives an eccentric shaft 15 to cause generally vertical reciprocation of a pair of rods 16 disposed on opposite sides of said conveyor 1. Each rod 16 is pivotally connected to an arm 17, which arm in turn is pivotally connected to an upstanding support 18 on said base 2 and to an extensible link 19 (in the form of a hydraulic shock absorber, for example). Said link 19 is of a form such that the conveyor 1 can gradually settle under load and such that at the operating frequency of the conveyor substantially equal to the natural frequency of springs 6, said link is of fixed length for all practical purposes whereby the amplitude of vibration of the conveyor remains substantially constant at all settled positions of the conveyor. The extensible link enables the settling of the conveyor 1 as it is loaded to be absorbed by the springs 6 and relieves the drive shaft 15 and its bearings of forces which might otherwise be imposed thereon. As the conveyor settles pivot 19' between the end of link 19 and conveyor base ring 2 and pivot 18' on bracket 18 of base ring 2 move downward. This causes link 19 to be shortened since lever arm 17 pivots clockwise around pivot 18' to enable pivot 16' between rod 16 and arm 17 to maintain its elevation without transmitting downward directed forces through rod 16 to the shaft 15. This action will occur under stationary and operating conditions since link 19 changes its length slowly with respect to the frequency of vibration during conveying. Obviously, energy impulses at a frequency corresponding to the natural frequency of the springs 6 may be imparted to the counterbalancing member 9 instead of to the conveyor 1 since whether the energy impulses are transmitted directly to the conveyor 1 and thence through the rod-like members 10 and springs 6 to the counterbalancing member 9 or directly to the counterbalancing member 9 and thence to the conveyor 1 through said springs 6 and rod-like members 10 is immaterial. The main requirement is that the member 9 and empty conveyor 1 be of substantially the same mass, the conveyor load not changing the operating frequency.

Referring now to Figs. 4 and 5, two spiral conveyors 25 and 26 are disposed in end-to-end relation with the spiral pan 27 of the lower conveyor overlapping above the lower end of the spiral pan 28 of the upper conveyor so that the conveyed material will be discharged from pan 27 onto pan 28 while the conveyors are operated in phase opposition as hereinafter indicated.

When the conveyors 25 and 26 are of relatively great height, 20 feet or more for example, the opposite ends thereof will be provided with center bearings 29 and 30 respectively. Vertical shafts 54 concentric with the axis of each conveyor fit into respective bearings 29 and 30 for rotational movement with respect thereto. The vertical movement of shafts 54 incidental to the spiral conveying motion is accommodated by the cantilever or leaf springs 55 secured to the structure upon which the conveyor is supported at 56 and which sustain bearings 29 and 30 at their free ends. The vibration of the conveyors in phase opposition along the parallel paths 31, is effected as by means of a drive assembly 32 which is located between said conveyors and operatively connected to the lower end of the upper conveyor 26 and to the upper end of the lower conveyor 25.

As shown, said drive assembly 32 comprises an electric drive motor 33 which through belt 34 drives the pulley 35 of the jack shaft 36, said shaft having a pulley 37 at each end. On opposite sides of the upper conveyor 26 and fixed to the motor support base 38 are journal blocks 39 for eccentric shafts 40, the latter having pulleys 41 thereon, each driven by a belt 42 which is trained over pulley 41 and the associated pulley 37. The rotation of eccentric shafts 40 causes the rods 43 and 44 to reciprocate in phase opposition to impart generally vertical energy impulses to the respective conveyors 25 and 26, through the linkage mechanisms which include links 45, 46, 47 and 48. Links 45 each comprise a lever pivoted at one end 57 to a bracket 57' on the annular base 58 for each conveyor so that vertical displacement of the base, as when the conveyor loading is increased, requires no vertical displacement of drive links 43 and 44 coupled thereto at intermediate pivots 59. Instead, vertical displacement of the conveyors cause levers 45 to pivot around pivots 59 and vertically displace pivots 46' and thus lever 47 through link 46. Links 46 are pivoted to lever 45 at 46' and to lever 47 at 47'. Levers 47 are pivoted at 49' to brackets 49 secured to the conveyor bases 58 and move the pivots 48' at the end of levers 47 in the direction of conveyor displacement but with magnification according to the lever arm ratios of the linkage. Links 48 are preferably in the form of hydraulic shock absorbers which are of substantially constant length at operating frequency so that substantially constant amplitude vibration is transmitted to the conveyors through brackets 49, but which may gradually shorten or lengthen to allow the conveyors to settle upon their spring mountings according to the load of conveyed material. The ends of the shock absorbers 48 are pivoted to their respective conveyor bases on pivots 58' fixed on those bases. Said spring mountings comprise coil springs 50 circularly arranged around the conveyors and having their ends secured to base 38 and through conveyor base rings 58 to the respective conveyors 25 and 26. Each conveyor base ring 58 is secured to and supports its respective conveyor by means of brackets, such as angles (not shown) which extend radially inward therefrom to the supporting tube 52 or 53 for the spiral pans 27 or 28 of that conveyor. Coil springs 50 have their axes disposed generally parallel to the desired path of vibration 31 and lateral support for said springs and guiding of the conveyors is provided as by means of the rod members 51 which are pivotally connected at their opposite ends to said support base 38 and to the ring 58 supporting the respective conveyors 25 and 26 through the intermediary of rubber bushings or the like.

Where it is desired to cool the material which is being conveyed the center tubes 52 and 53 of the conveyors 25 and 26 will be provided with openings through which air may sweep over the bed of conveyed material on the spiral pans 27 and 28 and the juxtaposed ends of said center tubes will be secured together as by means of a flexible sock (not shown) which allows the opposed vibration of said conveyors 25 and 26.

It will thus be seen that when material to be conveyed is loaded onto the lower end of the bottom spiral pan 27, the vibration of the bottom conveyor 25 along the path 31 will cause such material to be conveyed upwardly and to be discharged onto the lower end of the top conveyor 26 whereupon the vibration of the top conveyor along the same path 31, but in phase opposition, will cause material to continue to advance upwardly to the top of said top conveyor.

Since the two conveyors 25 and 26 are operated at the same frequency, but in phase opposition, the vibrations thereof will not be transmitted to the building structure either through the center bearings 29 and 30 or the center drive assembly 32.

In the balanced construction illustrated in Figs. 6 and 7 two spiral conveyors 60 and 61 are mounted side by side for resilient guided movement along the generally helical paths 62 denoted by the arrows in direct phase opposition to each other so that the net result of the vibrations of said conveyors will be zero whereby the vibrations are not transmitted to the building foundation 63. Herein the conveyors are each jointly supported by a series of coil springs 64 and a series of pivotally mounted rod-like members 65 and vibrations are imparted to the conveyors as by means of a drive motor 66, which through belts 67 and pulleys 68 and 69, drives the eccentric shaft 70. Said shaft 70 extends diametrically across the conveyors 60 and 61 and the rods 71 impart generally vertical impulses to said conveyors through arms 72, said arms being pivotally connected to said rods 71 and to brackets 73 of said conveyors and to hydraulic shock absorbers 74 also mounted on said conveyors, said hydraulic shock absorbers permitting settling of the conveyors on their resilient mountings under load while a predetermined amplitude of vibration in phase opposition is transmitted to the conveyors 60 and 61 by the eccentric rods 71.

Other modes of applying the principle of the invention may be employed, change being made as regards the details described, provided the features stated in any of the following claims or the equivalent of such be employed.

I, therefore, particularly point out and distinctly claim as my invention:

1. In combination, a spiral conveyor adapted to be vibrated along a generally helical path to toss conveyable material thereon angularly upward, counterbalancing means adapted to be vibrated along a like helical path, resilient means supporting said conveyor and counterbalancing means for vibration along such helical paths, and impulse-generating means operatively connected to said conveyor and said counterbalancing means for vibrating said conveyor and said counterbalancing means at a predetermined frequency and in phase opposition, said counterbalancing means comprising another spiral conveyor which is located underneath said first conveyor and having its material supporting surface disposed to discharge the conveyed material from the top thereof onto the bottom portion of the material supporting surface of said first conveyor.

2. Mechanism comprising at least two vibratorily supported masses, at least one of which is a vertical spiral conveyor, linkage connecting said masses whereby vibration of one results in vibration of the other in the same directional path and at the same frequency but in phase opposition, and means for vibrating at least one of said masses, the other of said masses comprising another vertical spiral conveyor disposed axially adjacent one end of said spiral conveyor, and said means for vibrating at least one of said masses being disposed therebetween and operatively connected to said other one of said masses.

3. A vertical conveyor for conveying material or articles in a generally helical curved path about a vertical axis, said conveyor comprising two conveyor sections, each of which includes an elongated vertical tubular member and an associated helical tray encircling said member, each helical tray being carried by its associated tubular member, said helical trays being disposed in continuation of one another, one of said trays being located above and coaxially of the other tray, means interconnecting said sections and power means for vibrating said interconnecting means so as to impart to said conveyor sections oscillatory movements in opposite senses and about a generally vertical axis and generally along said axis.

4. In combination a spiral conveyor adapted to be vibrated along a generally helical path to toss conveyable material thereon angularly upward, counterbalancing means disposed coaxially of said conveyor and adapted to be vibrated along a helical path, a base, separate resilient means separately supporting said conveyor and counterbalancing means coaxially from said base for vibration along such helical paths, and impulse-generating means operatively connected to said conveyor and counterbalancing means for vibrating the latter in phase opposition to said conveyor such that the torsional and vertical force components of the conveyor are counterbalanced by equal and opposite torsional and vertical force components of the counterbalance.

5. A vertical conveyor for conveying material or articles in a generally helical curved path about a vertical axis, said conveyor comprising an elongated vertical tubular member coaxial with said axis, a helical tray encircling said member and carried by said member, a mass counterbalancing said tubular member and said tray, said mass being distributed coaxially of said vertical axis and having an effective moment of inertia around said axis approximately equal to the effective moment of inertia of said tubular member and tray around said axis, a base, a plurality of resilient members interconnecting said tubular member and said mass, said resilient members being disposed around the common vertical axis of said tubular member and said mass and being inclined to the horizontal plane, a plurality of guide members individually connecting said members and said mass to said base, and an actuating means on the base coupled at least to said tubular member for causing oscillatory movements of said tubular member and said mass in opposite senses about a generally vertical axis and in opposite senses along said vertical axis.

6. In combination, a fixed support, a spiral conveyor adapted to be vibrated with respect to said support along a generally helical path around a generally vertical axis to toss conveyable material thereon angularly upward, a mass distributed around a generally vertical axis and adapted to be vibrated with respect to said support along a generally helical path around its axis, linkages connecting said mass, said conveyor and said base whereby vibration of one around its axis results in vibration of the other around its axis in generally the same directional path and at the same frequency but in phase opposition, resilient means interconnecting the conveyor and mass, and means for vibrating at least one of said mass and said conveyor with respect to said support whereby the other of said mass and said conveyor is also vibrated through said linkage, said mass being of a magnitude and moment of inertia to approximately counterbalance said conveyor.

References Cited in the file of this patent

UNITED STATES PATENTS

| | | |
|---|---|---|
| 1,495,850 | Jacqueline | May 27, 1924 |
| 1,641,435 | Jacobsen | Sept. 6, 1927 |
| 1,652,833 | Nesbitt | Dec. 13, 1927 |
| 2,279,742 | Overstrom et al. | Apr. 14, 1942 |
| 2,464,216 | Devol | Mar. 15, 1949 |
| 2,658,268 | Spurlin | Nov. 10, 1953 |

FOREIGN PATENTS

| | | |
|---|---|---|
| 943,865 | France | Oct. 11, 1948 |